United States Patent [19]
Gerbel et al.

[11] Patent Number: 5,275,365
[45] Date of Patent: Jan. 4, 1994

[54] COLLAPSIBLE TABLE HEIGHT MACHINE SUPPORT

[75] Inventors: John A. Gerbel, Danville; Donald C. Lewis, Alameda, both of Calif.

[73] Assignee: Unilect Corporation, Dublin, Calif.

[21] Appl. No.: 825,193

[22] Filed: Jan. 24, 1992

[51] Int. Cl.$^5$ ............................................... A47K 1/04
[52] U.S. Cl. ................................... 248/129; 248/130; 248/135; 248/136; 248/439; 280/47.2; 280/47.33
[58] Field of Search ............... 280/30, 35, 641, 651, 280/47.33, 47.2; 248/129, 128, 133, 135, 143, 136, 130, 371, 372.1, 397, 439, 440; 312/244, 257.1, 351.13, 249.8

[56] References Cited

U.S. PATENT DOCUMENTS

| | | | |
|---|---|---|---|
| 234,486 | 11/1880 | Leyburn | 280/47.2 |
| 533,505 | 2/1895 | Stagman | 248/129 |
| 682,443 | 9/1901 | Wood | 248/136 |
| 1,114,647 | 10/1914 | Pippin | 280/37 |
| 1,453,547 | 5/1923 | Culver et al. | 248/136 |
| 1,525,685 | 2/1925 | Olson | 248/129 |
| 1,609,207 | 11/1926 | Schlabaugh | 248/136 |
| 1,609,913 | 12/1926 | Olson | 248/143 |
| 2,354,941 | 8/1944 | Treitel | 280/641 |
| 2,427,782 | 9/1947 | Hausman | 280/30 |
| 2,579,639 | 12/1951 | Adams | 280/30 |
| 2,761,690 | 9/1956 | Bradley | 280/47.33 |
| 3,258,275 | 6/1966 | Schaefer et al. | 280/47.2 |
| 3,460,850 | 8/1969 | Franklin | 280/47.2 |
| 3,598,390 | 8/1971 | Armitage | 280/47.2 X |
| 3,729,209 | 4/1973 | Litz | 280/651 X |
| 3,930,663 | 1/1976 | Scripter | 280/47.33 X |
| 4,369,985 | 1/1983 | Bourgraf et al. | 280/641 |
| 4,765,644 | 8/1988 | Bell | 280/641 |
| 4,886,233 | 12/1989 | Bateman et al. | 248/129 X |

FOREIGN PATENT DOCUMENTS 2226949  6/1993  United Kingdom ................. 248/128

*Primary Examiner*—Alvin C. Chin-Shue
*Assistant Examiner*—Korie H. Chan
*Attorney, Agent, or Firm*—Townsend and Townsend

[57] ABSTRACT

A collapsible table height cart is disclosed for elevating a table top mounted case enclosed machine, such as a voting station for deployment of a direct recording electronic voting machine. The erection of the case on the cart is assisted by a series of pivoting motions over a cart fulcrum for ease of voting station erection by polling place personnel having less than average strength. The collapsed cart is flush to one side of the case. The case and collapsed cart transport on a supporting tracking wheel pair protruding from a lower edge of the case at the collapsed cart. Stowing occurs with the case containing the polling station standing on end in a substantially vertical position. Support of the polling station in the vertical stowed position occurs from both the tracking wheel pair and paired arcuate members extending over the bottom edge of the cart. Rocking of the case on the paired arcuate members away from the tracking casters enables the tracking caster pair to pivot away from the collapsed cart on a tracking caster frame pivoting from the fulcrum support in the middle of the cart. When the tracking casters pivot outwardly from a position flush the surface of the case, support of the case on the cart occurs from an A-frame support with exposed steerable caster wheels supporting one side of the A-frame and the tracking caster wheels supporting the other side of the A-frame. Thereafter, the case tilts on the A-frame support and rocks about the fulcrum from the A-frame side having the steerable caster wheels to the A-frame having the tracking caster wheels. This pivotal motion exposes a leg frame under the case. This leg frame is in turn pivoted downward and away from the case bottom on the side of the A-frame having the steerable casters. A final tilting of the case on the fulcrum of the cart lands the leg frame adjacent the steerable casters with the case in the horizontal position. Once the case is in the horizontal position, the direct recording electronic voting machine and its attendant voting booth can be deployed.

12 Claims, 3 Drawing Sheets

COLLAPSIBLE TABLE HEIGHT MACHINE SUPPORT

This invention relates to collapsible and portable machine support which collapses about a case enclosed machine and after appropriate transport can be erected to support the machine. In the preferred embodiment, a case mounted direct recording electronic voting machine is disclosed in combination with a collapsible table height support. In the collapsed position, the collapsible table couples to the voting station for transport and storage with the station. In the erected position, the collapsible table forms, in conjunction with the voting station, a polling place voting booth with direct recording electronic voting. Provision is made to facilitate erection utilizing over center pivot on a fulcrum to enable voting station erection by unskilled polling place workers of less than ordinary physical strength.

BACKGROUND OF THE INVENTION

Many machines are case enclosed for transport. At the same time, these machines need to be erected—typically table height—for use at a site. A good example of such a machine is a direct recording electronic voting machine.

Voting machines traditionally have been cumbersome. Mechanical voting machines were traditionally massive, weighing many hundreds of pounds. These large bulky machines are difficult to move and set up, and constitute a serious storage problem between elections.

Machines utilizing punch cards have the advantage of being small. However, the ballots utilized with such punch card systems require tremendous advance planning, printing, and distribution. Errors in ballot layout and distribution can be catastrophic. Further, such punch cards require post-election processing to enable returns to be generated from the election.

Direct recording electronic voting machines have numerous advantages. First, individual machine tallying of the voting results occurs. Second, such machines are typically equipped with modules, which modules can be gathered, taken to a central station, and interrogated for rapid results. Finally, such machines do not require the elaborate preparation and distribution of large numbers of ballots prior to the election. Further, changes in the ballot structure can be made closer to the election with relatively reduced effort.

Unfortunately, modern direct recording electronic voting machines usually have been constructed around large bulky mountings, which mountings have rendered these machines almost as awkward as their mechanical voting machine counterparts. Typically, the machines are floor mounted and erect to a voting machine and booth configuration from their mounting on the floor. Further, transport, distribution and storage of such machines is a serious problem. For example, some direct recording electronic voting machines will not fit through a standard doorway. Further, size and weight of some direct recording electronic voting machines can constitute a problem. When it is remembered that election workers are typically part time workers—usually elderly—the use of large bulky machines become increasingly inappropriate.

RELATED DISCLOSURE

In a copending patent application filed simultaneously herewith entitled Table Top Mounted Modular Voting Machine, U.S. patent application Ser. No. 07/825,226 filed Jan. 24, 1992, we have disclosed a modular voting station contained within a case. A summary of this invention follows:

A direct recording electronic voting machine is encased for transport and storage within a closed shell casing having confronting concave shell halves and erects from the container when the container is in the open position at a table edge. The container is a rectilinear molded case defining recessed hand holds and molded wheel wells for mounting axle supported wheels for case transport. Interiorly, the case defines sufficient volume to contain the removably attachable direct recording electronic voting machine including a processor with printer, a membrane switch panel for enabling the ballot overlay and defining candidate selecting electronic membrane switches, and an emergency power supply. Additionally, the case defines sufficient vacant interval to enable precinct records to be previously collected, stored within the case, and transported, distributed and returned contained within the contained voting machine.

Machine and booth erection includes hinged opening movement of one shell half of the case to a braced open position locked by a conventional over center link. The membrane switch panel defining the ballot surface pivots about an internal pivot within the case on a side elongate upper edge of the table supported shell half of the case. Such pivotal movement includes movement of a membrane switch panel supporting frame actuated by two over center levers for moving the membrane switch panel to and from the erected position.

The structural rigidity of the membrane switch panel supporting frame interacts with the over center locking levers to assure locking of the booth in the erected disposition as well as to enable booth stowage without panel damage. The over center levers provide a spring biased erection and collapse of the membrane switch panel easing election worker manipulation of voting machine parts as well as damping panel movement to avoid damage to the panel. Additionally, the paired over center levers through the membrane switch panel supporting frame provide a safety interlock maintaining the panel in the upright position unless deliberate, simultaneous release of both over center locks occurs.

The membrane switch panel support frame anchors and supports a booth curtain on a hinged collapsible rod. This curtain at all times remains integral with the voting machine avoiding the common occurrence of booth curtain loss. During voting, the integral curtain assures required voter privacy and isolates the polling place worker and voter to their own portions of the voting machine in discrete tamper proof areas of the machine. The curtain and membrane switch panel together define a discrete voter enclosure isolated from the exposed voting machine and the necessary poll worker machine manipulation required between successive voter ballots on the machine. In the collapsed disposition, the curtain assists the packing of the relatively delicate membrane switch panel.

The membrane switch panel when erected is itself pivoted within the otherwise stationary voter booth. Such pivot occurs between a tilted back position for the normal erect voter to a tilted forward position for addressing the typically wheel chair bound handicapped voter. In both positions of the membrane switch panel, the curtain remains stationary assuring required voter privacy.

Preferably, the membrane switch panel supports at the top edge thereof a light rendering the erected voting booth independent of ambient and typically non-uniform lighting encountered in most polling places. There results a polling station that is self contained, capable of simple election preparation including storage and distribution of required precinct records, conveniently transported and placed for table top erection, and finally, easily collapsed and returned for required storage. In short, a collapsible voting machine is disclosed capable of cooperative interaction with the complexities of an election.

It is the purpose of this invention to provide to such a table top mounting voting machine a collapsible cart. The cart in the collapsed position serves to enable transport and storage of the polling booth. The cart in the erected position becomes an integral part of a polling booth with this erection being accomplished by polling place worker having rudimentary training and less than ordinary strength.

SUMMARY OF THE INVENTION

A collapsible table height cart is disclosed for elevating a table top mounted case enclosed voting station for deployment of a direct recording electronic voting machine. The erection of the case on the cart is assisted by a series of pivoting motions over a cart fulcrum for ease of voting station erection by polling place personnel having less than average strength.

The collapsed cart mounts at a frame member flush to one side of the case. The case and collapsed cart transport on a supporting tracking wheel pair protruding from a lower edge of the case at the collapsed cart. Stowing occurs with the case containing the polling station standing on end in a substantially vertical position. Support of the polling station in the vertical stowed position occurs from both the tracking wheel pair and paired arcuate members extending over the bottom edge of the cart.

Rocking of the case on the paired arcuate members away from the tracking casters enables the tracking caster pair to pivot away from the collapsed cart on a tracking caster frame pivoting from the fulcrum support in the middle of the cart. When the tracking casters pivot outwardly from a position flush to the surface of the case, support of the case on the cart occurs from an A-frame support with exposed steerable caster wheels supporting one side of the A-frame and the tracking caster wheels supporting the other side of the A-frame.

Thereafter, the case tilts on the A-frame support and rocks about the fulcrum from the A-frame side having the steerable caster wheels to the A-frame having the tracking caster wheels. This pivotal motion exposes a leg frame under the case. This leg frame is in turn pivoted downward and away from the case bottom on the side of the A-frame having the steerable casters.

A final tilting of the case on the fulcrum of the cart lands the leg frame adjacent to the steerable casters with the case in the horizontal position. Once the case is in the horizontal position, the direct recording electronic voting machine and its attendant voting booth can be deployed.

It is to be understood that the pivoted legs effectively brake the now horizontal case from movement. By the expedient of having the case mount to the fulcrum with an eccentric weight balance on the leg frame side of the case, the described erection process can occur with minimal effort and training of polling station personnel.

DESCRIPTION OF THE PREFERRED EMBODIMENT

Figure 1:
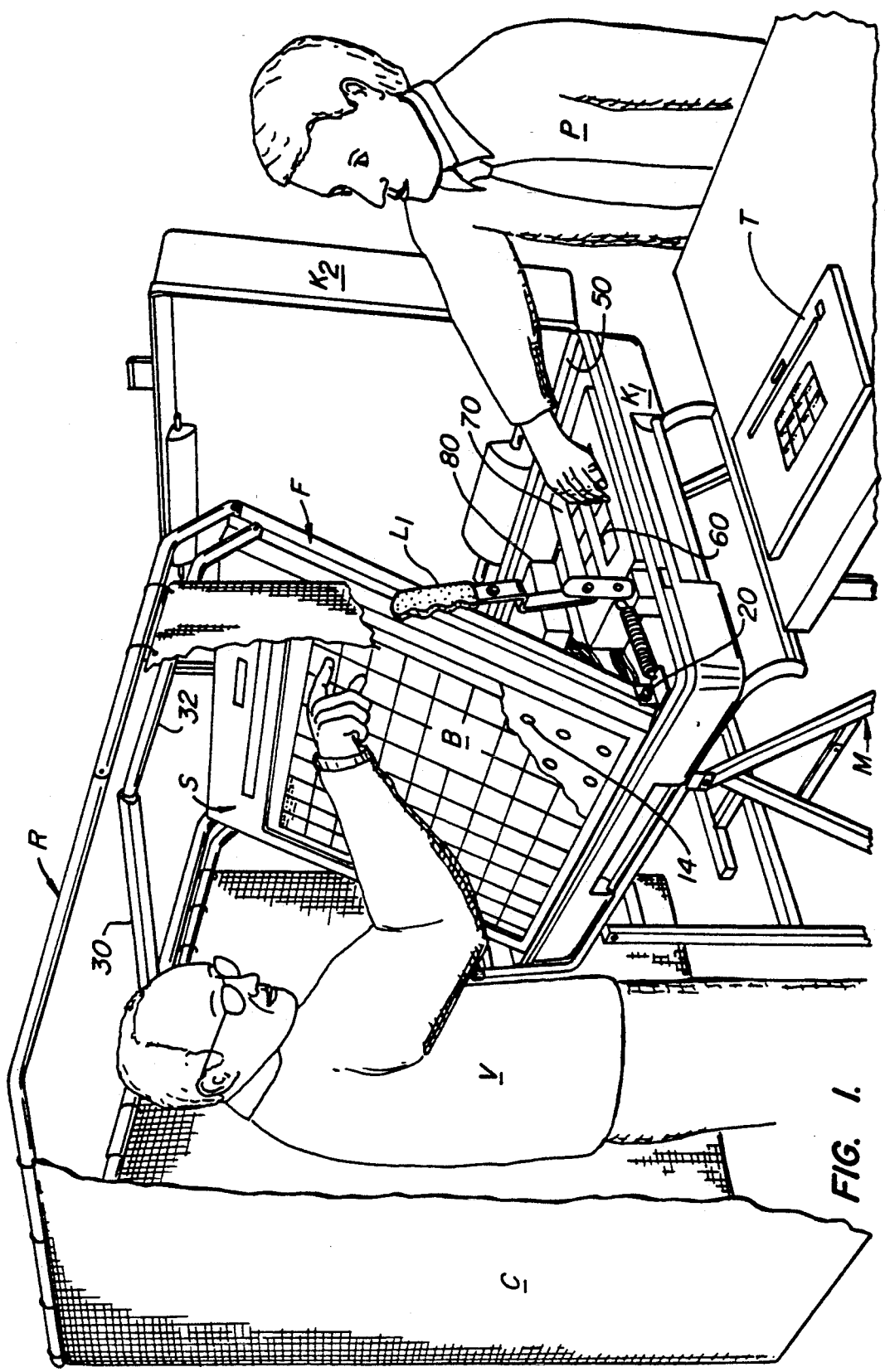
FIG. 1 is a perspective view of the cart mounted polling station in the horizontal position with the polling station including the voting booth and direct recording electronic voting machine fully deployed illustrating a voter in the booth and a polling place worker both utilizing the deployed voting machine.

Referring to FIG. 1, the deployed voting machine is shown in perspective mounted on the cart M of this invention. Voter V is shown depressing printed ballot B overlying switchboard S. Ballot B defines the respective choices and candidates and typically defines areas overlying membrane switches 14.

Switchboard S is in turn supported on frame F which frame pivots about hinge 20. Pivoting of frame F on hinge 20 occurs with two over center levers $L_1$ and $L_2$ on each side of frame F (only one lever $L_1$ being shown in FIG. 1).

Curtain rod R supports curtain C, which curtain is typically pulled about voter V while the ballot is cast. Light 30 on light rod 32 illuminates the voting booth interior rendering voting lighting independent of the usually unpredictable lighting found in most polling places.

Light rod 32 attaches to membrane switch panel S at the top portion thereof. It is to be noted that curtain rod R attaches to frame F. In this way, when switchboard S is tilted forward and held rigidly with respect to frame F by link 40 for a handicapped voter V, the booth curtain remains elevated and unchanged—assuring the privacy of the handicapped voter.

It can be seen that containing case includes concave confronting halves $K_1$ and $K_2$. These respective halves are connected along one case confronting side by hinge 50. Further, it will be observed that hinge 50 is parallel to hinge 20 with the hinges being on opposite side edges of case half $K_1$.

It can be seen that case half $K_1$ contains processor 70 which in the usual case of direct recording electronic voting machines records a cumulative total of the vote. This cumulative total of the vote is electronically recorded to a module, the module removed, and data transmitted for automated electronic counting. Since it is not the purpose of this disclosure to set forth the inner workings of the electronics of the voting machine, further mention of the function of processor 70 will for the most part be omitted.

In one aspect, operation of processor 70 is important. Typically, processor 70 at controls 60 enables polling place worker P to actuate the voting machine to receive each successive voter V. This being the case, it will be noted that curtain C and switchboard S effectively separates voter V and polling place worker P. It is not practically possible for worker P to invade the privacy of voter V. Likewise, the layout discloses that it is not possible for voter V to easily access controls 60 on processor 70 behind switchboard S.

Some voter training of voters V is required before a ballot can be cast. To this end training panel T is typically packed interior of case K. Before entry into the defined booth, voter V can receive whatever rudimentary training is required for the appropriate electronic voting.

Figure 3:
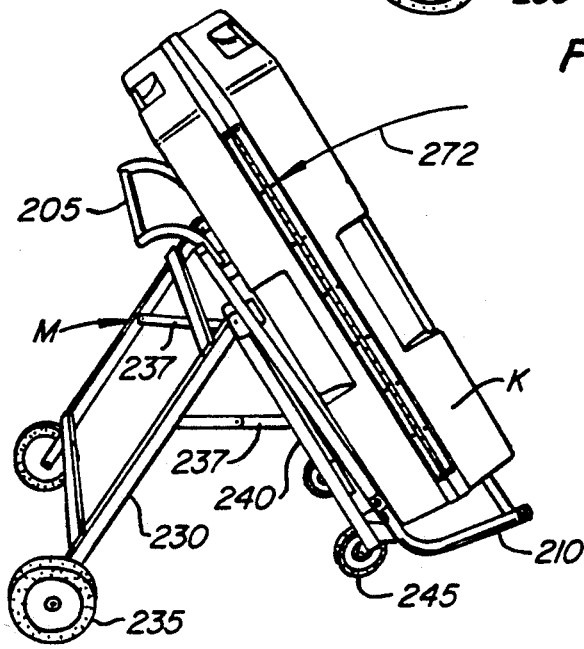
FIG. 3 illustrates the hand cart in the tilted forward position with the transporting wheels being pivoted away from the cart to define the "A-frame" disposition.

In the particular configuration here shown, an emergency power supply 80 is included. Additionally, and as shown in FIG. 3, polling place records 90 may be prepackaged within case K, removed when case K is first opened, and thereafter utilized in the polling station. Further, and upon completion of desired voting, the records may be returned with the collapsed station interior of case K.

Having set forth the preferred embodiment, and realizing that the particular machine mounted on the collapsible cart M of this invention can include other machines, the sequence of cart collapse and operation can be set forth. Specifically, and with respect to FIG. 5, the parts of the erected cart will first be set forth. Thereafter, and with reference to the sequence of FIGS. 2–5, operation of the cart will be set forth.

Figure 5:
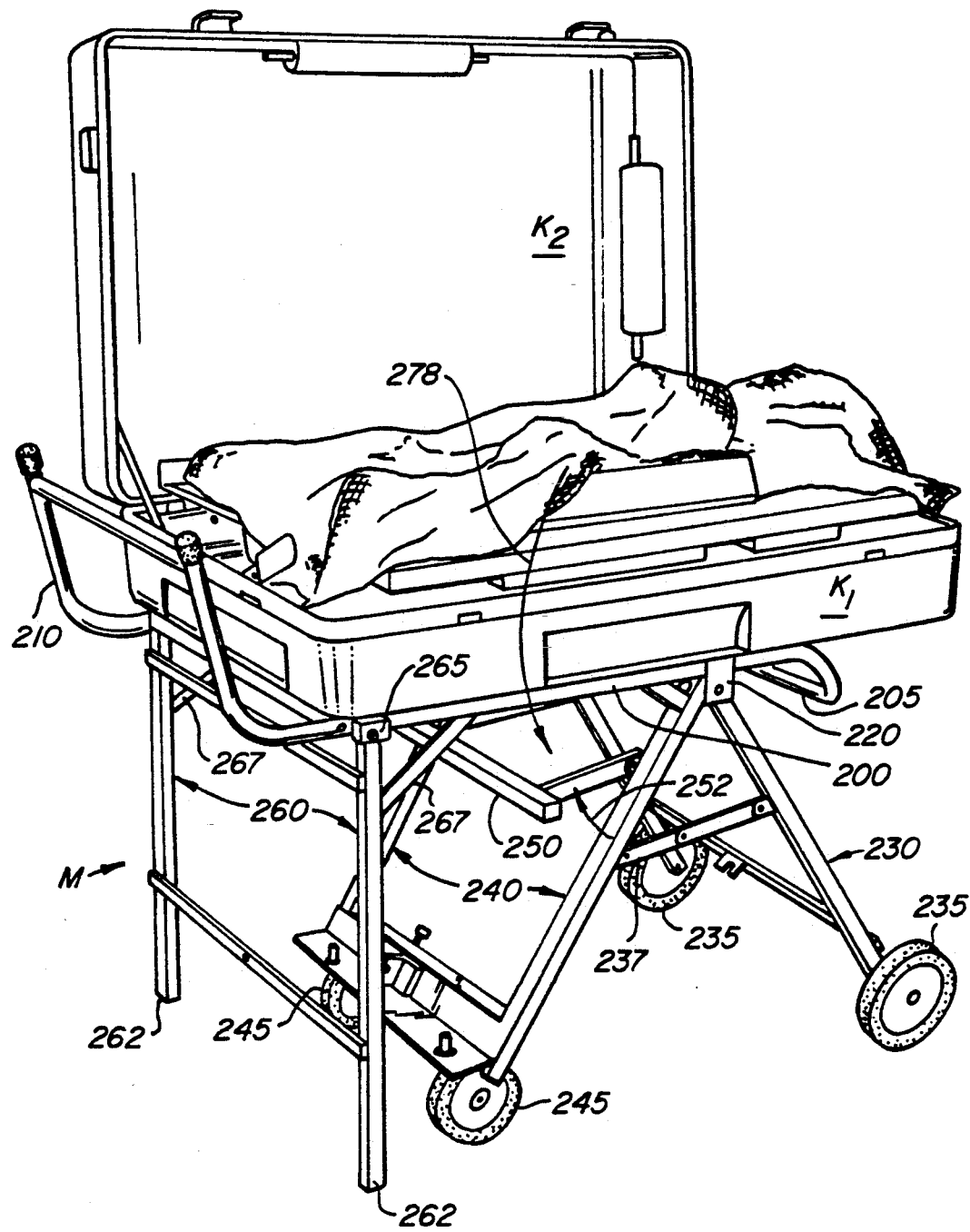

Referring to FIG. 5, case K bolts at case half $K_1$ to frame 200 by conventional bolts—typically four in number—not shown. Frame 200 includes a handle portion 205 at one end and arcuate forks 210 for standing and storing the case with the collapsed cart M (See FIG. 2).

The frame 200 includes a central fulcrum 220. From fulcrum 220 extend to wheel frames, which wheel frames form an "A-frame" type support for fulcrum 220. Tracking caster frame 230 supports tracking casters 235. These casters do not steer; the casters 235 track without themselves turning.

Steerable caster frame 240 supports steerable casters 245. Unlike tracking casters 235, steerable casters 245 permit the cart to be moved with direction.

It is required that tracking caster frame 230 and steerable caster frame 240 be maintained in stationary "A-frame" disposition. This is accomplished by a conventional over center link 237.

Steerable caster frame 240 supports biasing frame 250. Biasing frame 250 permits pivot of frame 200 on fulcrum 220 to and from a position parallel to steerable caster frame 240 under spring bias. Typically, case K is eccentrically weighted to and toward the steerable caster frame 240. By having biasing frame 250 resist movement of the case into pivoted juxtaposition to steerable caster frame 240, two effects can be realized. First, and when moving parallel to frame 240 about fulcrum 220, movement of case K is damped. Second, and when moving away from frame 240 about fulcrum 220, movement of case K is assisted. As will hereinafter become more apparent, biasing frame 250 assists in the erection (and collapse) process about to be described.

Finally, leg frame 260 having paired legs 262 pivots from frame 200 at leg frame pivot 265. Leg frame 260 is held in right angle relationship to frame 200 by conventional over center links 267.

It is necessary when the cart is in the collapsed disposition that locks hold the respective frame members in their collapsed disposition. A first lock 291 holds tracking caster frame 230 adjacent frame 200. A second lock 290 holds steerable caster frame 240 adjacent frame 200. A final lock 292 holds leg frame 260 adjacent frame 200. Only the locations of the locks are designated. The locks are otherwise conventional. Therefore, the actual construction will not be set forth.

Having set forth the major operative parts of this invention, operation can be understood.

Figure 2:
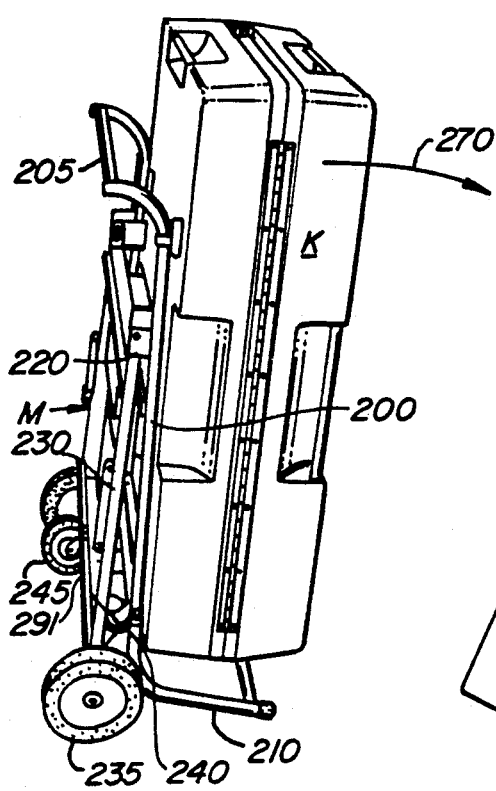
FIG. 2 illustrates the collapsed polling station fully contained within a containing and transporting case illustrating the case canted angularly backwards with "hand cart" transport of the cart and contained polling station occurring.

Referring to FIG. 2, the cart M in the stored position is illustrated. Cart M remains fastened to case K at frame 200. Both steerable caster frame 240 and tracking caster frame 230 pivot on fulcrum 220 adjacent the bottom of arcuate forks 210. The case K and frame 200 have upright vertical support between tracking casters 235 and arcuate supports 210 and are maintained in this position by conventional locks (not shown). It is in this position that the cart M and case K are stored.

Referring to FIG. 3, a first step in the erection of cart M is shown. Typically, case K is rocked forward in the direction of arrow 270 (see FIG. 2), so as to lift tracking casters 235 free of support. Thereafter, tracking caster frame 230 pivots on fulcrum 220 away from steerable caster frame 240. Such pivot continues until A-frame over center link 237 stops this pivot. At this point, case K is rocked back in the direction of arrow 272 until tracking casters 235 land for support of the case. At the same time, case K rocks for support at steerable caster frame 240 on steerable casters 245. This results in the disposition of case K shown in FIG. 3.

Figure 4:
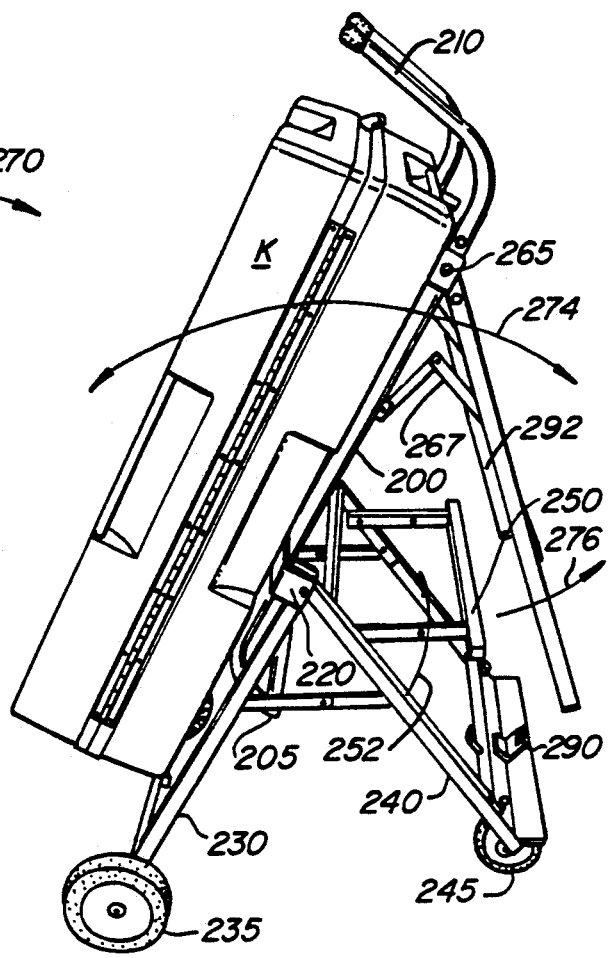
FIG. 4 illustrates the contained voting station on the cart having been pivoted to the opposite side of the "A-frame" with the result that legs shown partially swinging downward are exposed; and, FIG. 5 illustrates the case in the supported horizontal position with the frame and tracking caster wheels essentially anchoring the device.

Referring to FIG. 4, case K at frame 200 is released from a position adjacent steerable caster frame 240 at lock 290 (partially shown). Pivot on fulcrum 220 occurs in the direction of arrow 274. Case K rotates from a first position where frame 200 was adjacent steerable caster frame 240 to a second position adjacent tracking caster frame 230. During this movement, biasing frame 250 urges frame 200 and case K in this pivotal direction. This pivot continues until case K is in the position shown in FIG. 4.

When case K is adjacent tracking caster frame 230, legs 260 are exposed from under frame 200 and are free to pivot about their respective leg pivots 265. Such pivoting occurs in the direction of arrow 276 until conventional over center links 267 stop this movement. Links 267 are dimensioned and positioned to stop such movement when leg frame 260 is at right angles to frame 200.

FIG. 5 tells the remainder of the story of erection of cart M. Specifically, frame 200 and case K pivot again on fulcrum 220 until leg frame 260 at legs 262 comes into support with the ground.

It will be remembered that case K is eccentrically weighted to and toward steerable caster frame 240. This being the case, legs 262 and tracking casters 235 will maintain the case K stationary. If some adjustment of machine position is required, lifting of arcuate forks 210 can cause relocation.

Further, cart M in the disposition of FIGS. 3 and 4 can be conventionally directed and steered to any desired location.

The reader will understand that a novel cart M is disclosed. This cart enables storage, transport, erection, and placement of a rectilinear case enclosed machine from a vertical stored position to a horizontal stationary position for use. Further, since the erection sequence includes mainly simple pivoting motions, the process of erection is extremely simple.

What is claimed is:

1. In a collapsible transport and stationary table for a case enclosed machine comprising in combination:
   a case enclosing said machine;
   a support frame for fastening to the bottom of said case;
   a fulcrum pivot on said support frame;
   a first pivotal frame member for pivoting with respect to said fulcrum pivot having a ground engaging attachment at one end and pivotal attachment to said fulcrum at the other end;
   a second pivotal frame member for pivoting with respect to said fulcrum pivot having a ground engaging attachment at one end and pivotal attachment to said fulcrum at the other end;
   locking means attached between said first and second pivotal frame members permitting said first and second frame pivotal frame members to be placed over one another in a first relative co-planar position with respect to said case and allow said members to be moved to and maintain a locked spaced apart A-frame disposition relative to said fulcrum between said first and second pivotal frame members with said first pivotal frame member defining one side of said A-frame and said second pivotal member defining said opposite side of said A-frame, and said locking means disposed horizontally therebetween;
   said support frame pivotal on said locked spaced apart A-frame about said fulcrum between a first position on one side of said A-frame where said support frame member leans on said one side of said A-frame and to a second position on said opposite side of said A-frame where said frame member leans on said opposite side of said A-frame;
   leg frame means pivotally attached to said support frame whereby said leg frame means is pivoted away from said support frame when said support frame is on the opposite side of said A-frame; and,
   means for locking said leg frame means into place to dispose said frame in a horizontal disposition whereby said case on said frame is disposed in a horizontal position.

2. The collapsible transport and stationary table of claim 1 and wherein:
   said case is eccentrically weighted with respect to said fulcrum support; and,
   means attached to one of said pivot frame members for biasing movement of said case and support frame from leans on to one side of said A-frame and from leaning on the opposite side of said A-frame.

3. The collapsible transport and stationary table of claim 2 and wherein:
   said case is eccentrically weighted to said opposite side of said A-frame whereby said leg frame is biased relative to said fulcrum to and towards the ground.

4. The collapsible transport and stationary table of claim 1 and wherein said first pivotal frame member includes grounding engaging means including tracking casters for engaging the ground.

5. The collapsible transport and stationary table of claim 4 and wherein the ground engaging means of said second pivotal frame member includes steerable casters.

6. The collapsible transport and stationary table of claim 5 and wherein said tracking casters overlie said steerable casters for permitting transport of said case enclosed voting station on said tracking casters when said first and second frame member are moved to said superimposed disposition.

7. In process for providing a collapsible transport which can be converted to a stationary table for a case enclosed machine comprising in combination:
   providing a case;
   enclosing said machine is said case;
   providing a support frame;
   fastening said support frame to the bottom of said case;
   providing a fulcrum pivot on said support frame;
   pivoting a first pivotal frame member with respect to said fulcrum pivot having a ground engaging attachment at one end;
   pivoting a second pivotal frame member with respect to said fulcrum pivot, said second pivotal frame having a ground engaging attachment at one end and pivotal to a first position substantially co-planar to said first pivotal frame member and whereby said second pivotal frame member pivot away from said first pivotal frame member to a second position wherein said second pivotal frame member forms an A-frame disposition with respect to said first pivotal frame member;
   providing a lock for locking said first and second pivotal frame members in said A-frame disposition;
   said first pivotal frame member defining one side of said A-frame and said second pivotal frame member defining the opposite side of said A-frame member, and said lock disposed horizontally between the first and second pivotal frame members
   locking said lock to maintain said first and second pivotal frame members in said A-frame disposition;
   pivoting said support frame on said fulcrum pivot between said first position on said one side of said A-frame where said support frame member leans on said one side of said A-frame and to said second position on the opposite side of said A-frame where said frame member leans on said opposite side of said A-frame;
   providing leg frame means pivotally attached to said support frame, pivoting said leg frame away from said support frame when said support frame is on the opposite side of said A-frame; and,
   locking said leg frame means into place to dispose said leg frame normally to said support frame whereby said support frame is disposed as said stationary table.

8. The process of claim 7 and wherein:
   eccentrically weighting said case with respect to said support frame to bias said support frame with respect to said fulcrum support.

9. The process of claim 8 and wherein:
   providing means attached to one of said pivot frame members for biasing movement of said case and support frame from confrontation to said one side of said A-frame to confrontation to the opposite side of said A-frame.

10. The process of claim 7 and wherein:
    eccentrically weighting said case on said support frame to said opposite side of said A-frame whereby said leg frame is biased to and towards the ground.

11. The process of claim 7 and wherein;
    providing said first pivotal frame member with grounding engaging means including tracking casters for engaging the ground.

12. The process of claim 11 and wherein:
    said provided ground engaging means of said second pivotal frame member includes steerable casters.

* * * * *